United States Patent [19]

Johnson

[11] Patent Number: 4,534,684
[45] Date of Patent: Aug. 13, 1985

[54] APPARATUS FOR MILLING A GEAR FOR A DOUBLE ENVELOPING WORM GEAR DRIVE

[76] Inventor: Bernard H. Johnson, Plymouth, Mich.

[21] Appl. No.: 431,724

[22] Filed: Sep. 30, 1982

[51] Int. Cl.³ .............................................. B23F 9/14
[52] U.S. Cl. .................................... 409/26; 51/56 G;
    409/29; 409/40; 409/41; 409/44; 409/51;
    409/55
[58] Field of Search ...................... 409/27, 29, 30, 31,
    409/34, 35, 38, 39, 40, 43, 44, 55, 57, 20, 22, 25,
    26; 51/52 R, 52 G, 48 HE, 950 A

[56] References Cited

U.S. PATENT DOCUMENTS

| 624,676 | 5/1899 | Parks | 409/57 |
|---|---|---|---|
| 1,853,643 | 4/1932 | Simmons | 409/39 |
| 1,940,703 | 12/1933 | Stewart | 409/57 X |
| 1,948,530 | 2/1934 | Miller | 409/34 X |
| 1,998,835 | 4/1935 | Fellows | 409/35 |
| 2,114,690 | 4/1938 | Sykes | 409/35 |
| 2,302,004 | 11/1942 | Carlsen | 409/30 |
| 2,667,818 | 2/1954 | Stewart et al. | 409/30 X |
| 2,860,451 | 11/1958 | Deakin | 51/56 G |
| 3,234,852 | 2/1966 | Hunkeler | 409/44 |
| 3,818,796 | 6/1974 | Wildhaber | 409/40 |

Primary Examiner—William R. Briggs
Assistant Examiner—Glenn L. Webb
Attorney, Agent, or Firm—John P. Moran

[57] ABSTRACT

Apparatus for milling a gear for a double enveloping worm gear drive. A rotating milling cutter is advanced toward a workpiece spindle to mill a flank of a gear tooth by tilting the milling cutter supporting frame about an axis that passes through the axis of rotation of the workpiece spindle to form a predetermined change in the helix angle from the top to the root of the tooth. The initial tilt setting of the cutter is adjusted to suit the root helix angle.

17 Claims, 7 Drawing Figures

APPARATUS FOR MILLING A GEAR FOR A DOUBLE ENVELOPING WORM GEAR DRIVE

BACKGROUND OF THE INVENTION

This invention is related to apparatus for forming a gear for a double enveloping worm gear drive, and more specifically apparatus for milling bronze gear for such a drive.

A double enveloping worm gear drive employs what is commonly referred to as an "hour-glass" type enveloping worm and a throated gear which tend to wrap around each other to produce a drive. The gear teeth are straight sided, with flanks tangent to the gear base circle. Such a drive is useful because it produces an area contact, rather than the line contact of other worm gear drives. It is often known as a Cone drive, after the name of the inventor. Such gears are conventionaly made by employing an enveloping hob to semi-finish cut the gear. The gear is initially pre-cut slightly over-sized. The hob is then side-fed against either flank to finish to the desired tooth thickness.

SUMMARY OF THE INVENTION

The broad purpose of the present invention is to provide apparatus for milling a gear for a double enveloping worm gear drive. The preferred embodiment of the invention employs a pair of milling cutters, one for cutting each flank of the gear tooth. The two cutters are located on opposite sides of the workpiece spindle. The gear can also be cut with a single cutter by cutting one flank of each tooth, and then inverting the gear on the workpiece spindle to cut the opposite flank.

Each cutter is mounted on a base such that it can be advanced toward the workpiece spindle along a line tangential to the gear base circle, so that each flank of each tooth is tangent to the gear base circle. The milling cutter is carried on a body or frame mounted on a spindle that is movable about an axis that intersects the axis of the workpiece spindle at the point where the cutter reaches the root of the tooth flank. A cam arrangement is connected to the cutter supporting spindle in such manner that as the rotating cutter is advanced towards the gear to mill a tooth from tip to root, the cutter frame is tilted about its spindle to develop the required tip- to-root helix angle change.

The apparatus can be adjusted to accommodate different size gears. The same cutter can be employed for either a right hand or a left hand helix. The cutter can be utilized for all gears regardless of the gear ratio providing the cutter O.D. is appropriate for the gear being cut.. The apparatus is pre-set to accurately simi-finish cut the gear to a desired minimum over-sized tooth thickness, so that it can be readily finished with a hobbing machine.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
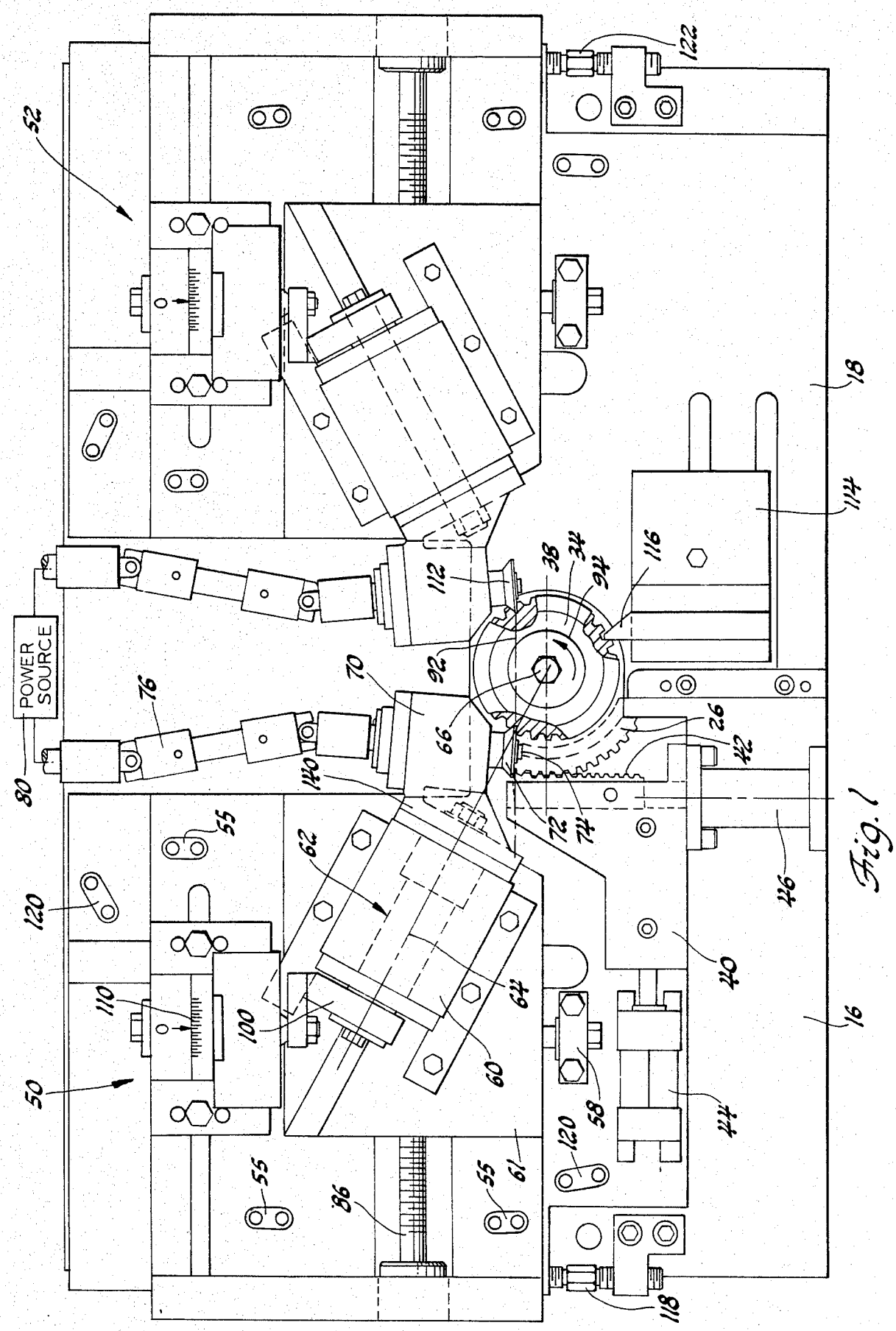
FIG. 1 is a plan view of milling apparatus illustrating the preferred embodiment of the invention.
Figure 2:
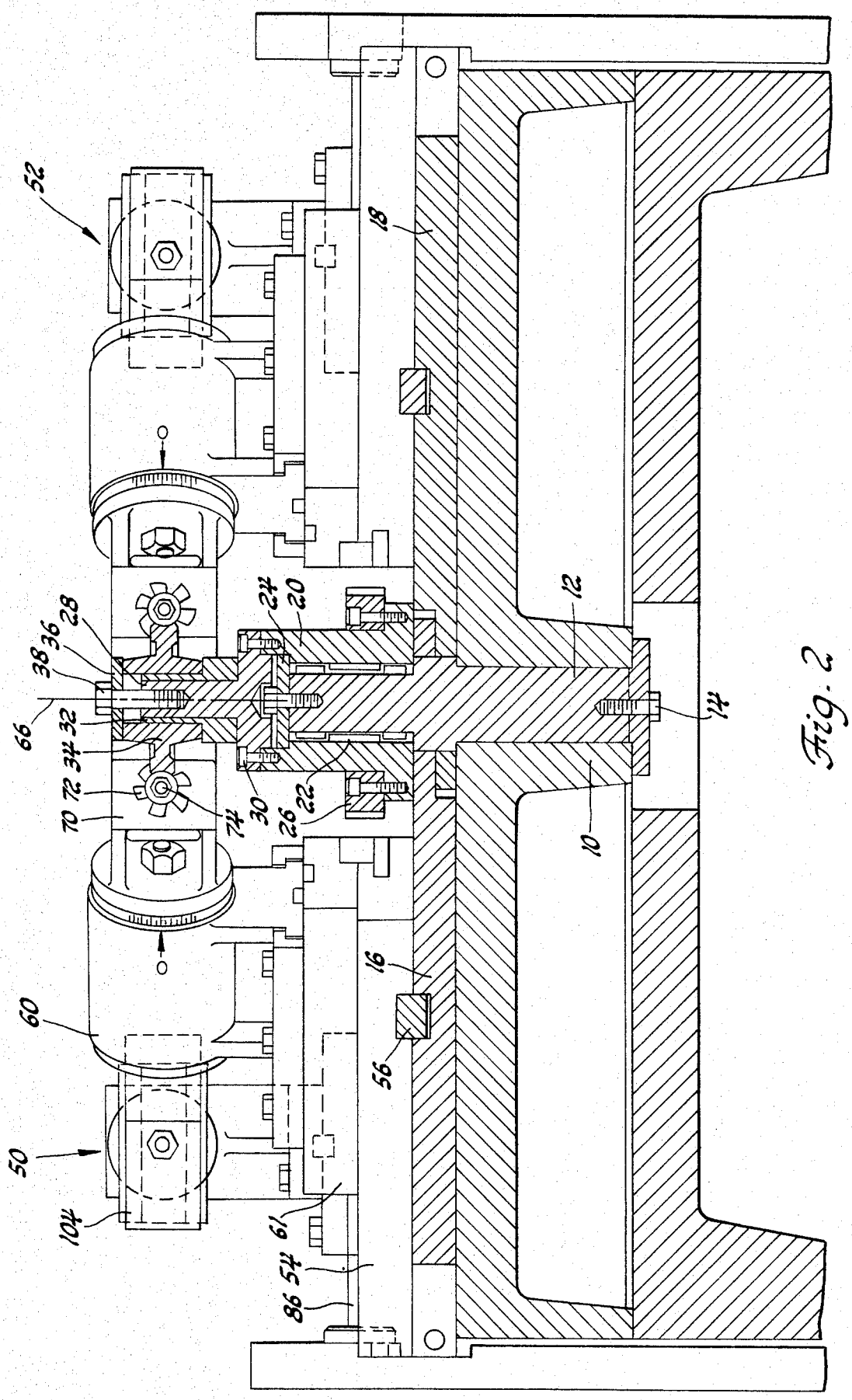
FIG. 2 is an elevational view thereof, generally as seen from the bottom of FIG. 1.

Referring to FIGS. 1 and 2, a preferred milling apparatus comprises a base means 10. An upright stanchion 12 is mounted on base 10. Fastener means 14 attaches stanchion 12 to the base. A pair of adjustment plates 16 and 18 are mounted on the base on opposite sides of the stanchion.

A sleeve 20 is rotatably mounted on the upper end of the stanchion. Bearing means 22 disposed between sleeve 20 and the stanchion, permit the sleeve to rotate with respect to the stanchion. A cap 24 is mounted on the upper end of the stanchion to closely position the sleeve with adjacent plates 16 and 18. An indexing gear 26 is fastened to the sleeve.

A spindle 28 is connected by fastener means 30 to the upper end of sleeve 20. An upper sleeve 32 is mounted on the spindle for receiving a bronze workpiece gear blank 34. A cap 36 is mounted on the upper end of the workpiece, and a fastener 38 fastens the cap and gear blank 34 to the spindle.

Referring to FIG. 1, a support 40 carries a rack 42 meshed with indexing gear 26. Pneumatic piston and cylinder means 44 are connected to support 40 to move the rack either toward or away from the indexing gear. A second piston and cylinder means 46 are also connected to support 40 for moving the rack to rotate the indexing gear.

In operation, piston and cylinder means 44 are employed to move the rack away from the indexing gear to disengage their respective teeth. When the rack is engaged with the indexing gear, piston and cylinder means 46 are employed to rotate the indexing gear to position it for cutting the next tooth.

The air pressure acting on cylinder means 44 functions to lock the indexing gear in a precise position together with the gear blank during each cutting operation.

Two milling cutter means 50 and 52 are mounted on the base on opposite sides of the stanchion. The two milling cutters are basically identical to one another, except for a right and left hand relationship. Thus a discussion of milling cutter means 50 also applies to milling cutter means 52.

Milling cutter means 50 includes a support plate 54 mounted on adjusting plate 16. Key means 56 provides means for adjusting the location of support plate 54 on the adjusting plate.

Referring to FIG. 1, means 58 provides means for adjusting plate 54 on plate 16. Fastener means 55 locks plate 54 on plate 16. A hollow frame or body 60 is mounted on plate 61. Spindle 62 is mounted in body 60. As best illustrated in FIG. 1, spindle 62 has a lontitudinal axis 64 that intersects the axis of index rotation 66 of the workpiece spindle, when cutter reaches the gear root.

A milling cutter body 70 is carried on one end of spindle 62 for tilting motion about axis 64. A milling cutter 72 is mounted on a shaft 74, carried in the body, which in turn is connected to flexible drive means 76. As best illustrated in FIGS. 2, 4, 6 and 7 milling cutter 72 has a series of spaced, identically shaped cutting edges for progressively engaging gear blank 34. The cutter is driven by a power source 80.

Figure 3:
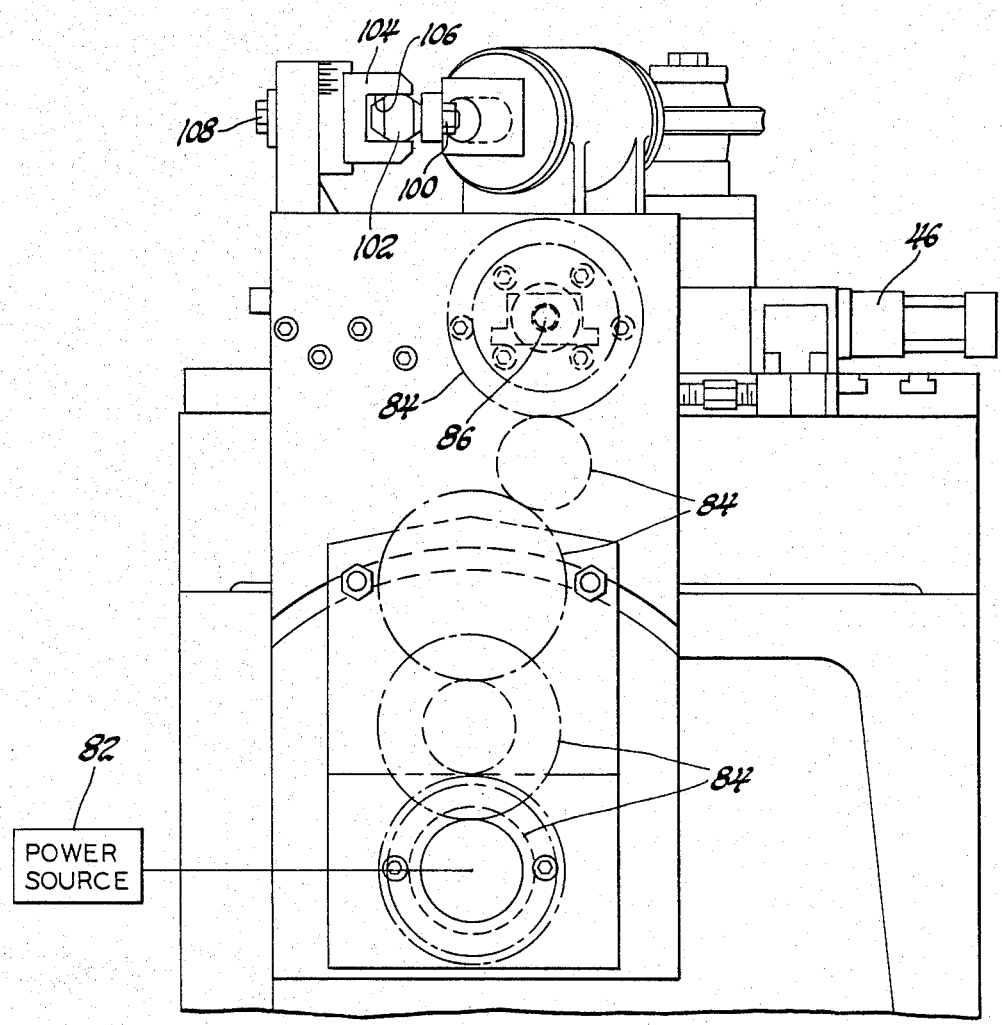
FIG. 3 is a view of the workpiece spindle support and infeed drive means.
Figure 4:
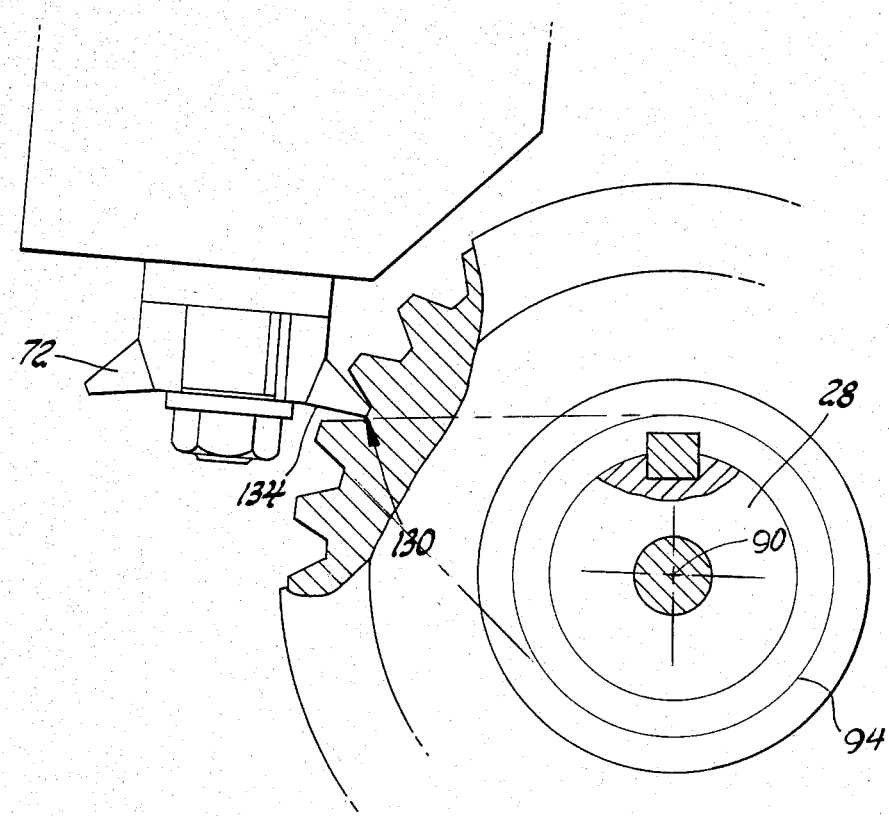
FIG. 4 is a view illustrating the manner in which the cutter clears the tooth flank as the cutting tip edge is moved toward the tooth root.

Referring to FIGS. 1 and 3, the means for moving the rotating milling cutter toward the workpiece spindle comprises power source 82, connected to gear train means 84, which in turn is connected to a feed screw 86. The power source is adapted to rotate the feed screw in one direction for advancing the rotating milling cutter toward the workpiece, and in the opposite direction for moving the rotating milling cutter in the opposite direction. The feed screw is connected to base 61 upon which body 60 is mounted for either engaging or disengaging the rotating cutter from the workpiece. The feed screw is adapted to move the milling cutter along a plane 92 that is parallel to the axis of motion of the feed screw and tangent to gear base circle 94 so that each flank of each tooth is tangent to the gear base circle, as illustrated in FIG. 4.

Referring to FIGS. 1, 2, and 3, an arm 100 is carried at the rearward end of the spindle 62. A ball-shaped cam follower 102 is carried on the end of arm 100 so as to be movable with the spindle, between raised and lowered positions. As the follower is raised, it tilts the spindle and thereby the milling cutter in one direction, and similarily, as it is lowered, it tilts the spindle and thereby the milling cutter in the opposite direction.

A cam 104, having a linear channel-shaped track 106, is mounted on the base. The cam and locking screw means 108, provide means for locking the inclination of cam track 106 with respect to the base. The amount of inclination of the cam track defines the tilt of the cam track and thereby the inclined path changes the angle of the milling cutter as it advances from the tip to the root of the tooth. The cutter tilt is initially pre-set at the gear root position.

Dial means 110 permit the user to define the degree of tilt. The arrangement is such that, when cam track 106 is parallel to the adjusting plates, the milling cutter will not rotate about the axis of spindle 62 as it is being advanced toward the workpiece spindle. By adjusting the amount of tilt angle of the cam track, the user can adjust the helix angle change of the path of the rotating milling cutter as it progresses from the tip toward the root of the tooth.

Milling cutter means 52 functions in the same manner as milling cutter means 50, except that milling tool 112 forms the opposite flank of each tooth.

The apparatus can operate with only a single cutter by employing cutting tool 72 to form one flank of each tooth, unlocking the gear blank from the spindle, inverting the gear blank, and then remounting it. Gage means 114 has a sliding tooth 116 mounted on the base for the user to precisely set-up the gear blank in a preset position for milling the back flank of each tooth for the desired tooth thickness.

Adjustment means 118, mounted between plate 16 and base 10 and locked with screws 120, provides means for adjusting the tooth thickness of each tooth. Similarily, adjustment means 122 mounted on the opposite side of the base, provides means for presetting the machine for the flank to be cut by cutting tool 112.

The distance between plane 92 and apex 90, that is the radius of the gear base circle, is adjusted for each size base circle by means 58 and locked with screws 55.

Figure 6:
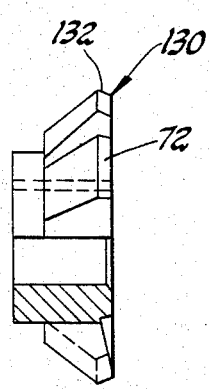
FIG. 6 is a view as seen along lines 6—6 of FIG. 7.
Figure 7:
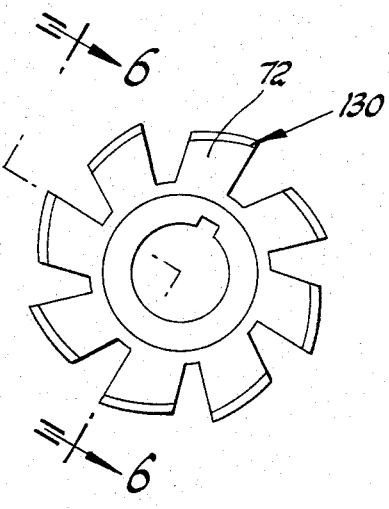
FIG. 7 is a view of the preferred cutter.

FIGS. 4, 6 and 7 illustrate the preferred cutter. Each blade of the cutter has a tip cutting edge 130 that forms the surface of the flank of each tooth as the rotating cutter is moved from the tip to the tooth root. As the cutter approaches the tooth root, then cutting edge 132 forms the root space between neighboring teeth.

As best illustrated in FIG. 4, each blade of the cutter is slanted as at 134 in such a manner that it does not destroy the flank that has been formed by the tip cutting edge. This relief of each cutter blade prevents it from destroying the gear flank as the rotating cutter is fed toward the gear root.

To set the helix angle, head 140 of the cutter frame is adjusted on body 60. The head has a series of internal serrations so that it can be locked in a selected angular position. Then the preset cam is adjusted to accommodate the precise helix angle change from tip to root after the cutter has been adjusted for the root position. The angle of the cam follower determines the tip to root helix angle change.

Figure 5:
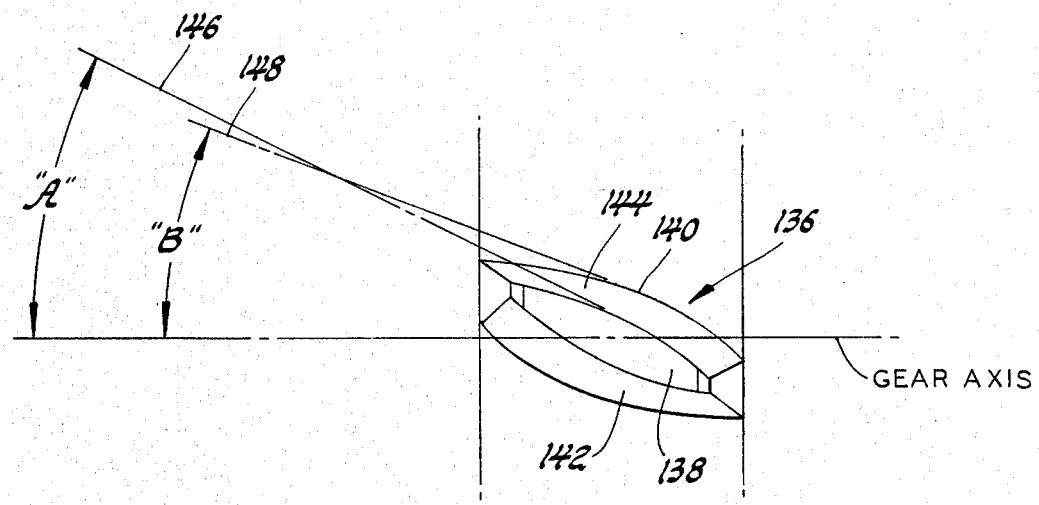
FIG. 5 is an enlarged view of a typical gear tooth illustrating the change in the helix angle from tip to root.

FIG. 5 illustrates a typical tooth in order to point out the reason for tilting the cutter as it advances from the tip to the root. A typical gear tooth 136 has a tip 138 and a root 140. A flank 142 connects the tip to the root on one side of the tooth, and a flank 144 connects the tip to the root on the opposite side of the tooth. A tangent line 146 drawn from the center of the tip and tangent to the tip defines an angle "A" with a plane containing the axis of rotation of the gear. Similarly, a tangent line 148 drawn from the center of the root and tangent to the root defines and angle "B" with a plane passing through the axis of rotation of the gear.

Rotating cutter 72 upon initially engaging one flank of the gear tooth is tilted to cut the surface that is tangent along the line 146. As the gear moves toward the root, the helix angle of the tooth changes. To accommodate this change from tip to root, cam follower 102 gradually tilts the cutter frame according to the inclination of cam 104.

Having described my invention, I claim:

1. A method for cutting the flank of a straight-sided tooth of a double-enveloping worm drive gear, comprising the steps of:
    supporting a gear blank having a first axis of rotation in a fixed position during cutting, and a base circle with a center lying on said first axis; and
    engaging a cutting member rotating about an axis with the gear blank along a first linear path of motion tangential to said base circle while progressively tilting the cutting member as it is being moved in a rotating cutting motion from the tip to the root of the tooth being formed.

2. A method as defined in claim 1 in which the cutting member comprises a milling cutter.

3. A method as defined in claim 1 in which the cutting member is tilted about an axis passing through the midsection of the tooth root and intersecting said first axis.

4. A method as defined in claim 1, including the step of cutting the face of a second tooth by engaging the cutting member in a rotating cutting motion with the gear blank along a second path of motion tangential to said base circle.

5. A method as defined in claim 1, in which the cutting member cuts the full length of the gear tooth flank as the cutting member is moved in a cutting motion along a linear path of motion from the tip to the root of the tooth.

6. A method as defined in claim 1, in which the cutting member is tilted from a first position toward a second position as the cutting member is moved in cutting engagement from the tip to the root of the gear tooth and including means for adjusting the range in the angle of tilt of the first position with respect to the second position.

7. A method as defined in claim 1, including means for adjusting the path of motion of the cutting member with respect to the gear blank according to the diameter of the base circle of the gear blank.

8. A method as defined in claim 1, including means for adjusting the initial tilt angle of the cutting member as it initially engages the tip of the gear tooth.

9. A method as defined in claim 1, in which the cutting member comprises a milling cutter having a cutting tip, and the milling cutter tip engages the gear blank in a rotating cutting motion.

10. Apparatus for milling the flank of a straight-sided tooth of double-enveloping worm drive gear having an axis of rotation and a base circle with a center tying on said axis of rotation, comprising:
 a base;
 an indexable workpiece supporting spindle mounted on the base;
 first means for mounting the gear blank on the workpiece supporting spindle;
 a milling cutter, and second means for rotating the milling cutter in a rotating cutting motion;
 third means on the base for moving the milling cutter in cutting engagement with the gear along a linear path of motion tangential to the base circle of the gear blank while the gear blank is held stationary by the supporting spindle; and
 fourth means for progressively tilting the milling cutter as it is being moved from the tip to the root of the tooth being formed on the gear blank.

11. Apparatus as defined in claim 10, in which the milling cutter is preset to a tilt according to the approximate root helix angle of the gear blank before the milling cutter begins to cut the tip of the tooth flank.

12. Apparatus as defined in claim 10, in which the milling cutter is supported such that its tip engages the gear blank in a rotating cutting motion.

13. Apparatus as defined in claim 10, including means for tilting the milling cutter about an axis passing through the blank mid-section of the gear tooth root and intersecting he axis of rotation of the gear.

14. Apparatus as defined in claim 10, including means for indexing the gear blank to a position for cutting the face of a second tooth by engaging the milling cutter in a rotating cutting motion with the gear blank along a second path of motion tangential to said base circle.

15. Apparatus as defined in claim 10, in which the milling cutter cuts the full length of the gear tooth flank, as the milling cutter is moved in a cutting motion from the tip to the root of the tooth.

16. Apparatus as defined in claim 10, including means for adjusting the path of motion of the milling cutter depending upon the diameter of the base circle of the gear being cut.

17. The apparatus described in claim 10, including right and left hand milling cutters positioned on opposite sides of the gear blank, and dual second, third and fourth means operatively connected to the respective milling cutters.

* * * * *